UNITED STATES PATENT OFFICE.

JOHN HOWARD BENNETT AND ALONZO FERMAN BEMAN, OF RIDGWAY, PENNSYLVANIA, ASSIGNORS TO THEMSELVES AND JAMES K. GARDNER, HUGH McGEEHIN, AND JOHN NAGLE, OF SAME PLACE.

COMPOSITION OF MATTER.

SPECIFICATION forming part of Letters Patent No. 668,901, dated February 26, 1901.

Application filed November 12, 1900. Serial No. 36,220. (No specimens.)

*To all whom it may concern:*

Be it known that we, JOHN HOWARD BENNETT and ALONZO FERMAN BEMAN, citizens of the United States, and residents of Ridgway, in the county of Elk and State of Pennsylvania, have invented a new and useful Improvement in Compositions of Matter, of which the following is a full, clear, and exact description.

Our invention seeks to provide a new compound which will rapidly repair any leak or injury in pneumatic tires used upon bicycles, carriages, automobiles, or other conveyances. To attain this purpose, we employ wheat-flour, lampblack, and potassium permanganate prepared so as to form a paste, as hereinafter described and claimed.

This specification reveals one method of making our compound. The true scope of our discovery is defined in the claims hereunto annexed.

In the preferred mode of preparing our compound fifty pounds of wheat-flour, one and one-half pounds of lampblack, and three ounces of potassium permanganate are intimately commingled while in a dry condition. To this mixture cold water is added until a paste of cream-like consistency is formed. The paste can be injected into the tire in any approved manner, although compressed air is the means preferred.

Our compound possesses adhesive qualities which render it particularly valuable for the repairing not only of pneumatic tires, but also of other fabrics and articles.

Having thus fully described our invention, we claim as new and desire to secure by Letters Patent—

1. The composition of matter herein described, consisting of flour, lampblack, potassium permanganate and water.

2. The composition of matter herein described, consisting of approximately fifty pounds of wheat-flour, one and one-half pounds of lampblack, three ounces of potassium permanganate, and a suitable quantity of water.

In testimony whereof we have signed our names to this specification in the presence of two subscribing witnesses.

JOHN HOWARD BENNETT.
ALONZO FERMAN BEMAN.

Witnesses:
JNO. G. WHITMORE,
FRED CLOUGH.